(12) United States Patent
Whiteford et al.

(10) Patent No.: US 6,648,391 B1
(45) Date of Patent: Nov. 18, 2003

(54) TRUCK BED EXTENSION DEVICE

(76) Inventors: Barry Whiteford, 266 Old Route 11, Canton, NY (US) 13617; Dana Williams, 990 Alamo Rd., Los Alamos, NM (US) 87644

( * ) Notice: Subject to any disclaimer, the term of this patent is extended or adjusted under 35 U.S.C. 154(b) by 0 days.

(21) Appl. No.: 10/135,587

(22) Filed: Apr. 30, 2002

(51) Int. Cl.⁷ .................................................. B62C 1/00
(52) U.S. Cl. ........................ 296/26.08; 296/50; 296/51; 296/57.1; 296/26.01
(58) Field of Search ........................... 296/26.08, 26.01, 296/57.1, 37.6, 50, 51, 53; 224/402, 521, 519, 520

(56) References Cited

U.S. PATENT DOCUMENTS

| | | | |
|---|---|---|---|
| 4,813,584 A | | 3/1989 | Wiley |
| 4,906,015 A | | 3/1990 | LaCroix et al. |
| D314,543 S | | 2/1991 | Ott et al. |
| 5,033,662 A | | 7/1991 | Godin |
| 5,067,640 A | | 11/1991 | Gaskill |
| 5,232,135 A | * | 8/1993 | Marren ........................ 224/509 |
| 5,267,748 A | | 12/1993 | Curran |
| 5,501,500 A | * | 3/1996 | Cannon ..................... 296/26.08 |
| 5,560,666 A | * | 10/1996 | Vieira et al. .................... 296/3 |
| 5,658,033 A | * | 8/1997 | Delaune ................... 296/26.08 |
| 5,699,985 A | * | 12/1997 | Vogel .......................... 224/521 |
| 5,938,092 A | * | 8/1999 | Johnson ....................... 224/521 |
| 6,070,926 A | * | 6/2000 | Hardin ..................... 296/26.08 |
| 6,089,431 A | * | 7/2000 | Heyworth ................... 224/521 |
| 6,113,171 A | * | 9/2000 | Stearns .................... 296/26.08 |
| 6,199,894 B1 | * | 3/2001 | Anderson ................ 296/26.08 |
| D441,340 S | | 5/2001 | Whiteford et al. |

* cited by examiner

Primary Examiner—Stephen T. Gordon
Assistant Examiner—G Blankenship
(74) Attorney, Agent, or Firm—Hovey Williams LLP

(57) ABSTRACT

A truck bed extension device (10) for use with a truck (12) having a cargo bed structure, wherein the device (10) allows for carrying items which extend beyond or overhang the bed structure. The device (10) comprises a deck (24); a support structure (26); and a signaling system (28). The deck (24) is horizontally adjustable relative to the bed structure so as to allow for achieving a desired spacing therebetween. The deck (24) is also vertically offset when unloaded so as to be substantially flush when loaded. Because the device (10) or the load carried thereon may obstruct viewing of the truck's existing brake and turn signals, the signaling system (28) repeats these signals where they are more visible. A second embodiment of the device (110) provides a hitch structure (170) for coupling the truck with a trailer via the device (110).

6 Claims, 3 Drawing Sheets

TRUCK BED EXTENSION DEVICE

BACKGROUND OF THE INVENTION

1. Field of the Invention

The present invention relates broadly to devices for enhancing the cargo carrying or hauling ability of a conventional truck. More particularly, the present invention concerns a truck bed extension device comprising a supported deck positionable substantially adjacent to and substantially flush with an end of an existing cargo bed structure of a conventional flatbed or pickup truck so as to allow for safely and securely carrying or hauling cargo items which extend beyond or overhang the existing bed structure.

2. Description of the Prior Art

It is often desirable to transport an item using the existing cargo bed structure of a conventional flatbed or pickup truck. Unfortunately, the item is sometimes longer than the truck is able to safely and securely accommodate. Certain types of items, including, for example lumber or piping, may simply be allowed to extend beyond or overhang the existing bed structure. Other types of items, however, including, for example, snowmobiles, all terrain vehicles, and motorcycles, cannot safely or securely be allowed to overhang the existing bed structure. This is particularly true where, for example, the extending end of the item is significantly heavy, or where certain specific points, such as wheels or legs, associated with the extending end of the item must be supported.

Where the existing bed structure includes a lowerable tailgate, it is often tempting to use the lowered tailgate as an extension to support the overlong item. Tailgates, however, are typically not designed to support significant amounts of weight, and may bend or be otherwise damaged under heavy loads. This is particularly true where, for example, the item is wheeled or legged and the wheels or legs rest on the lowered tailgate such that a substantial portion of the item's total weight is focused directly on the lowered tailgate.

Truck bed extension devices are known in the prior art which couple with the truck and project outwardly therefrom in a manner allowing for receiving and supporting items which extend substantially beyond the existing bed structure. Unfortunately, these prior art devices suffer from a number of disadvantages, including, for example, that they provide only a substantially one-dimensional linear support structure which is not suitable for resting and supporting wheels or legs upon. Furthermore, horizontal positioning of the prior art devices is typically not adjustable relative to the existing bed structure, and the support structure is typically spaced a substantial distance apart from an end of the existing bed structure, meaning that only items of a certain minimum length can be supported. Additionally, the prior art devices or the loads carried thereon typically obstruct views of brake lights, turn signals, and license plates which the law requires trucks and other vehicles to display. Such obstruction can potentially result in accidents where following drivers, unable to see the signaling lights of the truck, are left unaware of and unable to respond to braking or turning actions. Additionally, the prior art devices typically substantially interfere with access to an existing hitch structure commonly associated with a lower rear portion of the truck, thereby preventing use of the existing hitch structure to couple a trailer or other vehicle to the truck for towing.

Due to these and other problems and disadvantages in the prior art, a need exists for an improved device for enhancing the ability of a conventional truck to safely and securely carry or haul items which extend beyond or overhang an existing bed structure and tailgate of the truck.

SUMMARY OF THE INVENTION

The present invention solves the above-described and other problems and disadvantages in the prior art by providing a truck bed extension device comprising a supported deck positionable substantially adjacent to and substantially flush with an end of an existing cargo bed structure of a conventional truck so as to allow for safely and securely carrying or hauling items which extend beyond or overhang the existing bed structure. The truck may be, for example, any conventional flatbed or pickup truck having a lowerable tailgate, a receiver, and an electrical system.

In a preferred first embodiment, the device broadly comprises the deck; a support structure; and a signaling system. The deck is operable to directly support the item which overhangs the existing bed structure, including the lowered tailgate. The deck includes a platform surface, a platform support structure, and a coupling sleeve. The platform surface provides a substantially flat, two-dimensional surface upon which the item or a portion thereof can rest. The platform surface is between approximately 2 feet and 4 feet long, between approximately 4 feet and 6 feet wide, and is horizontally positionable so as to be no more than between approximately 0.25 inch and 1.00 inch away from the lowered tailgate. Furthermore, the platform surface may be vertically positioned between approximately 0.25 inch and 1.00 inch above the plane of the lowered tailgate when unloaded, so that the platform surface will be approximately flush with the lowered tailgate when supporting a load of, for example, between approximately 200 pounds and 300 pounds, thereby taking the majority of the load's weight off of the lowered tailgate.

The platform support structure operates to support the platform surface and to provide additional rigidity thereto. The coupling sleeve operates to removably and adjustably couple the deck with a first end of the support structure. The coupling sleeve is preferably adjustable upon the first end so as to accommodate achieving the aforementioned preferred horizontal spacing between the platform surface and the lowered tailgate. A rearward-facing portion of the platform support structure or of the coupling sleeve may include a license plate attachment mechanism for securing and properly displaying a license plate which would not otherwise be properly visible if secured to the truck in a conventional location.

The support structure operates to couple the device with the truck and to support the deck in its aforementioned preferred position. The support structure includes the first end, a second end, and a center section. The first end is substantially parallel with the lowered tailgate, and is received within the coupling sleeve of the deck, as previously mentioned. The second end is also parallel with the lowered tailgate, though substantially offset from and lower than the first end, and is operable to be removably received within the receiver of the truck in order to securely couple the device therewith. The center section provides proper vertical and horizontal offset between the first and second ends so that the platform surface will be in its preferred position substantially adjacent to and substantially flush with the lowered tailgate.

The signal light system is operable to electrically couple with the truck's electrical system, particularly its signaling system, and to communicate visible signals which substantially correspond to visible signals communicated by the truck's existing electrical system. The signal light system preferably includes left and right brake lights and left and right turn signals. The brake lights operate substantially conventionally to visibly warn following vehicles that the truck is actively braking; the turn signals operate substantially conventionally to visibly warn following vehicles that the truck is going to turn. This feature is particularly important as, even where the device itself does not obstruct viewing of the truck's existing signal lights, the load carried thereon may do so.

A preferred second embodiment of the device includes an adjustable hitch structure, which may include, for example, a conventional ball hitch, operable to couple the truck with a trailer or other towed vehicle via the device.

Thus, it will be appreciated that the device of the present invention provides a number advantages over the prior art, including, for example, providing a substantially planar platform suitable, for example, for resting and supporting wheels or legs upon. Furthermore, horizontal positioning of the device is advantageously adjustable relative to the lowered tailgate so that a desired closeness and clearance can be achieved. Additionally, vertical positioning of the device may be advantageously offset from the plane of the lowered tailgate when unloaded so as to be flush therewith when loaded. Additionally, the device provides a signaling system, including brake lights and left and right turns signals, which is electrically coupleable with the truck's electrical system so as to make brake and turning signals visible to following drivers, thereby making the device safer and more compliant with the law than prior art support mechanisms. Additionally, the device provides a license plate attachment mechanism for securing a license plate in a position where it is properly visible to following drivers. Additionally, in one embodiment, the device advantageously provides a hitch structure for coupling the truck with a trailer or towed vehicle via the device.

These and other important aspects of the present invention are more fully described in the section entitled DETAILED DESCRIPTION, below.

BRIEF DESCRIPTION OF THE DRAWINGS

A preferred embodiment of the present invention is described in detail below with reference to the attached drawing FIGURES, wherein.

DETAILED DESCRIPTION OF THE PREFERRED EMBODIMENT

Figure 1:
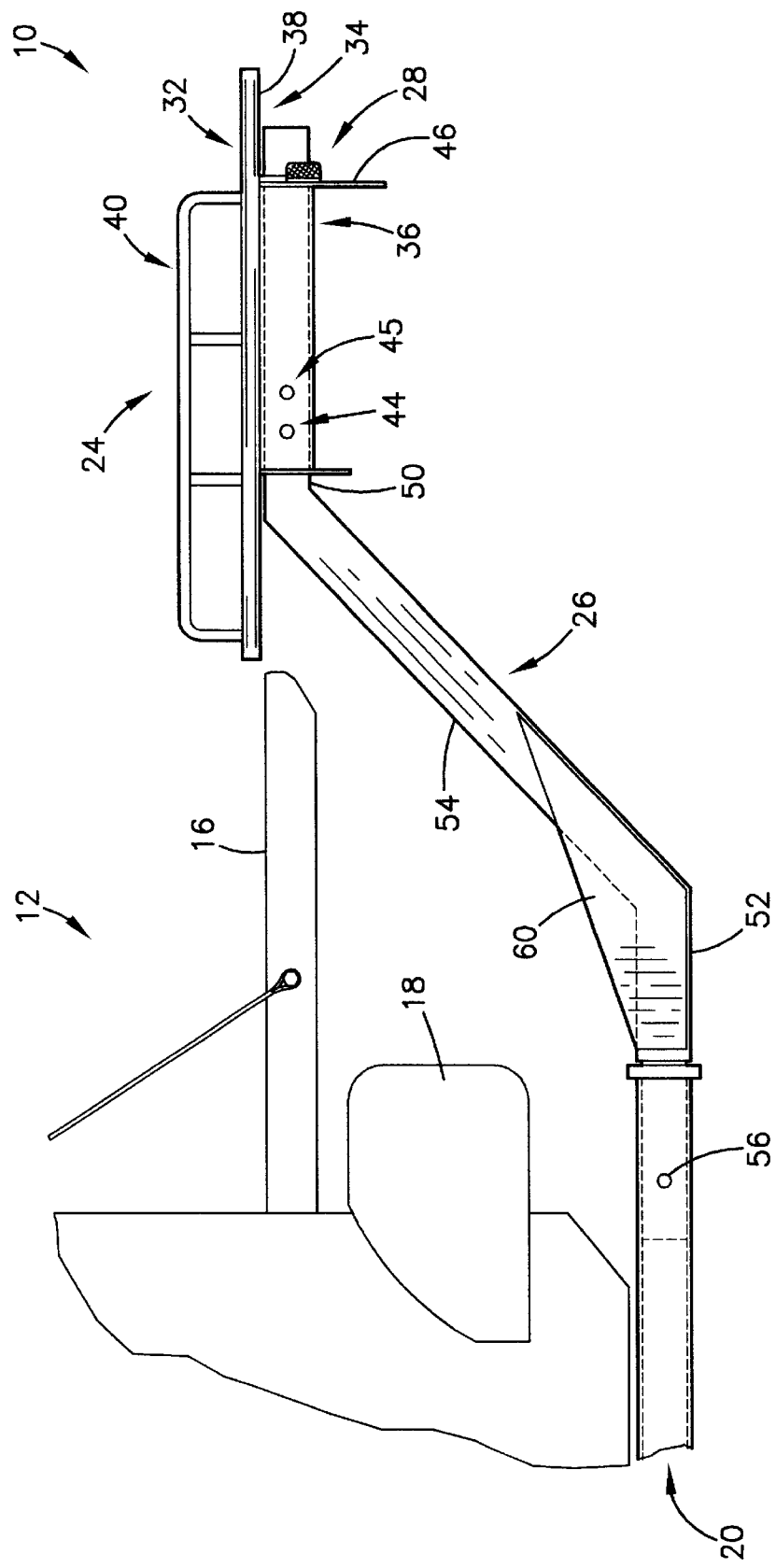
FIG.1 is a side elevational view of a preferred first embodiment of the device of the present invention, wherein the device is mounted upon a conventional truck.

Referring to the FIGURES, a truck bed extension device 10 is shown constructed in accordance with a preferred first embodiment of the present invention. The device 10 is operable to enhance the cargo hauling or carrying ability of a truck 12 such that a hauled item which would have otherwise unsafely extended beyond or overhung an existing cargo bed structure of the truck 12 is instead safely and securely supported for transport. The truck 12 may be, for example, a conventional pickup truck including the existing bed structure having a hinged and lowerable tailgate 16; a bumper 18; and a Reese-type trailer receiver 20. Alternatively, the truck 12 may be, for example, a conventional flatbed truck, with or without a hinged and lowerable tailgate.

Figure 2:
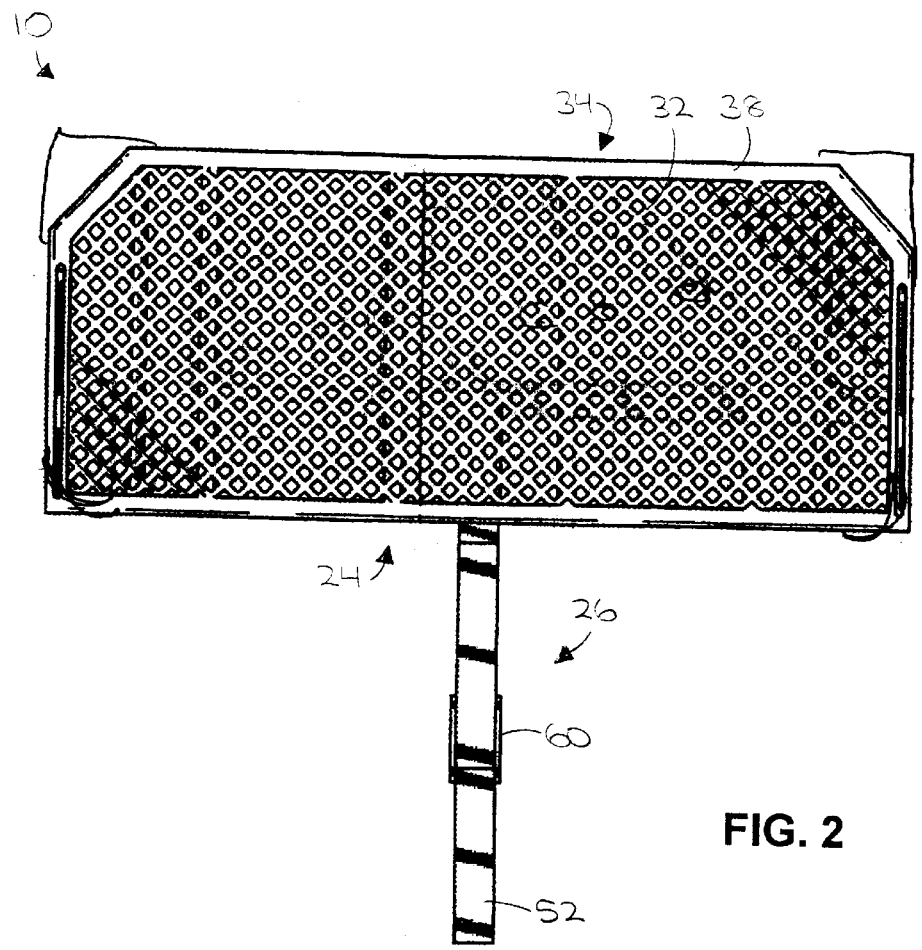
FIG. 2 is a plan view of the device of FIG. 1.

In a preferred embodiment, the device 10 broadly comprises a deck 24; a support structure 26; and a signaling system 28. Referring particularly to FIGS. 1 and 2, the deck 24 is operable to safely and securely support the item which overhangs the existing bed structure. The deck 24 includes a platform surface 32, a platform support structure 34, and a coupling sleeve 36. The platform surface 32 provides a substantially flat planar surface upon which the item or a portion thereof can rest. The platform surface 32 may be constructed of any suitable lightweight and strong material, such as, for example, commonly-available metal mesh material, sheetmetal, or a plurality of approximately 1 inch thick planks of wood, and may be covered with a wear-resistant or slip-resistant material, such as, for example, rubber. As illustrated, the platform 32 is approximately 2 feet long, between approximately 4 feet and 6 feet wide (or as wide as a rear edge of the lowered tailgate 16). Alternatively, particularly where the tailgate 16 has been removed or, more generally, where the cargo bed structure does not include a tailgate, the platform 32 may be between approximately 2 feet and 4 feet long. The platform surface 32 is preferably spaced substantially adjacent to the lowered tailgate 16, being spaced no more than between approximately 0.25 inch and 1.00 inch horizontally apart therefrom. Additionally, the deck 24 is preferably substantially vertically flush with the lowered tailgate 16, being positioned between approximately 0.25 inch and 1.00 inch above the plane of the lowered tailgate 16 when unloaded so that the platform surface 32 will be approximately flush with the lowered tailgate 16 when supporting a load of, for example, between approximately 200 pounds and 300 pounds, thereby taking the majority of the load's weight off of the lowered tailgate 16. Additionally, as shown in FIG. 2, the edges of the platform surface 32 may be rounded or otherwise softened so as to reduce risk of bruising or other injury when moving about the device 10, such as, for example, when tying down the load.

The platform support structure 34 operates to support the platform surface 32 and to provide additional rigidity thereto. As illustrated, the platform support structure 34 includes a perimeter piece 38 substantially surrounding a perimeter or outer edge of the platform surface 32, and one or more substantially straight ribs (not shown) directly underlying the platform 32 and welded or otherwise secured to the perimeter piece 38. The perimeter piece 38 may be flush with a top portion of the platform surface 32 or may extend between approximately 0.25 inch and 1.00 inch thereabove to aid in retaining the item on the platform surface 32. The platform support structure 34 is preferably constructed substantially of commonly available 1 inch square tubing, or, alternatively, of a similarly lightweight and strong material. The ribs add rigidity to the platform surface 32 and may extend lengthwise or widthwise or any combination thereof with respect to the platform surface 32.

As desired, one or more railings or grab bars 40 may be removably or permanently secured to one or more portions the perimeter piece 38 so as to project a desired and reasonable height, such as for example, 5 inches, above the top portion of the platform surface 32. The railings or grab bars 40 provide a number of advantages, including, for example, further aiding in retaining the item on the platform surface 32. Furthermore, as desired, one or more conventional light reflectors (not shown) may be secured at various points about the perimeter piece 38 or elsewhere on the device 10 for increased safety through added visibility.

The coupling sleeve 36 operates to removably and adjustably couple the deck 24 with the support structure 26. As illustrated, the coupling sleeve 36 is bolted or welded or otherwise removably or permanently secured to an underside of the platform support structure 34. The coupling sleeve 36 is preferably substantially constructed of commonly available 2.5 inch box tubing, or, alternatively, of a similarly lightweight and strong material. The coupling sleeve 36 presents an opening operable to receive a first end 50 of the support structure 26. The coupling sleeve 36 is adjustable upon the received first end 50 so as to accommodate achieving a proper or desired horizontal spacing between the platform surface 32 and the lowered tailgate 16 or other cargo bed structure. As previously mentioned, the platform surface 32 is preferably spaced no more than between approximately 0.25 inch and 1.00 inch horizontally apart from the lowered tailgate 16 for most applications. To accomplish the desired degree of removability and adjustability, the coupling sleeve 36 may present one or more holes 44 which correspond to and are alignable with holes provided in the first end 50 of the support structure 26 and which are operable to removably receive pins or bolts for securely coupling the deck 24 with the support structure 26. Alternatively, any suitable coupling and adjustment mechanism may be used for this purpose. Regardless of the mechanism used, however, the coupling sleeve 36 is preferably operable to cooperate with the first end 50 of the support structure 26 to allow the deck 24 and, more particularly, the platform surface 32 to be adjustable at least up to approximately 6.00 inches relative to the support structure 26 so as to allow for achieving the desired degree of separation between the platform surface 32 and the lowered tailgate 16.

The coupling sleeve 36 may present one or more tapped holes along its length for receiving one or more set screws or bolts 45. It will be appreciated that the mounted deck 24 may experience substantial play or movability due to excessive clearance between the interior of the coupling sleeve 36 and the first end 50 received therewithin. Tightening the set screws or bolts 45 within the tapped holes forces the set screws or bolts 45 into contact with the first end 50, thereby forcing the first end 50 against an opposite internal side of the coupling sleeve 36, which substantially increases the stability of the deck 24 by minimizing or substantially eliminating any undesired play or movability. Alternatively, shims or other mechanism might be used to reduce or substantially eliminate any undesired play or movability.

A rearward-facing portion of the platform support structure 34 or the coupling sleeve 36 may include a license plate attachment mechanism 46 or similar structure for securing and properly displaying a license plate which would not otherwise be properly visible if secured to the back of the truck in a conventional location. The license plate attachment mechanism 46 may take any suitable form, including, for example, one or more bolt holes 47 for bolting the license plate to the device 10.

The support structure 26 operates to safely and securely support the deck 24 in its aforementioned preferred position. The support structure 26 is preferably constructed of commonly available 2 inch box tubing, or, alternatively, of a similarly lightweight and strong material. The support structure 26 includes the first end 50, a second end 52, and a center section 54. The first end 50 is substantially parallel with the plane of the lowered tailgate 16 and is received within the coupling sleeve 36 of the deck 24, as described above. The first end 50 includes one or more holes which are alignable with the one or more holes 44 in the coupling sleeve 36 and operable, when so aligned, to removably receive pins or bolts placed therethrough for securely coupling the deck 24 with the support structure 26.

The second end 52 is also parallel with the plane of the lowered tailgate 16, though substantially offset from and lower than the first end 50, and is operable to be removably received within the receiver 20 of the truck 12 in order to securely couple the device 10 with the truck 12. In order to accomplish such coupling, the second end 52 may present one or more holes 56 corresponding to and aligned with holes provided in the receiver 20 and operable to removably receive pins or bolts for securely coupling the support structure 26 with the receiver 20. Alternatively, any suitable removable or permanent mechanism may be used for this purpose.

The center section 54 provides a proper vertical and horizontal offset between the first and second ends 50,52 so that, when the deck 24 is coupled with the first end 50, the platform surface 32 will be in its proper position substantially adjacent to and substantially flush with the lowered tailgate 16. The first end 50, second end 52 and center section 54 may be constructed of a single piece of material which has been appropriately bent, or may be constructed of multiple pieces securely coupled together, such as by welding. In either case, however, the intersection of the second end 52 and the center section 54 is preferably strengthened by a gusset 60, bracket, or other structural support placed thereabout. The gusset 60 maybe constructed, for example, of 0.25 inch plate metal welded to either side of the intersection.

Figure 3:
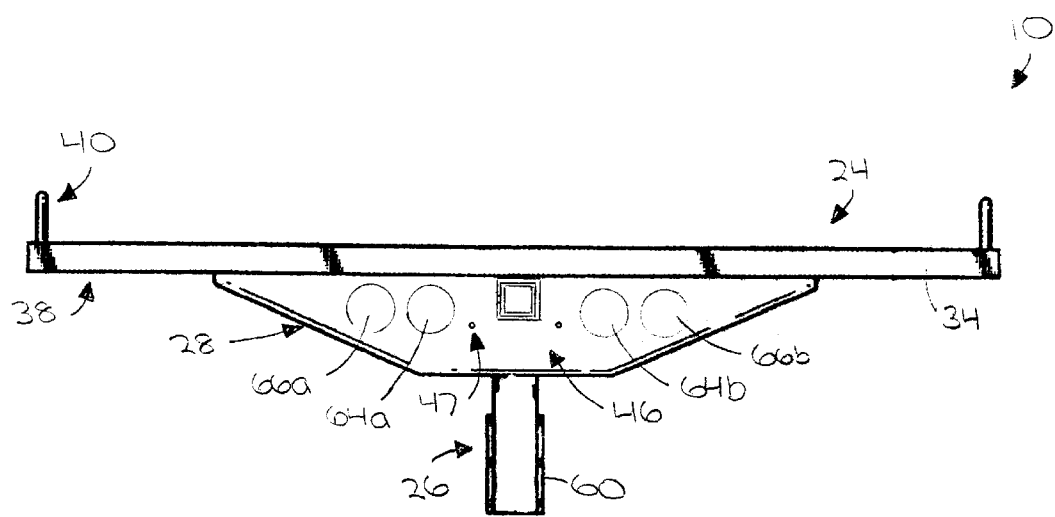
FIG. 3 is a rear elevation view of the device of FIG. 1.

Referring particularly to FIG. 3, the signal light system 28 is operable to electrically couple with an existing electrical system, particularly a signaling system, of the truck 12 and to communicate visible signals which substantially correspond to visible signals communicated by the existing electrical system. The signal light system 28 preferably includes left and right brake lights 64a,64b and left and right turn signals 66a, 66b. The brake lights 64a,64b operate substantially conventionally to visibly warn following vehicles that the truck 12 is actively braking; the turn signals 66a,66b operate substantially conventionally to visibly warn following vehicles that the truck 12 is going to turn. In a typically prior art truck bed extension device, the truck's signaling lights are behind the device or load carried thereon and are obstructed from view, thereby creating a potentially unsafe situation where a following vehicle is unaware of an impending braking or turning action of the truck 12. The signal light system 28 of the present invention, however, repeats these action signals in a location where the following driver is much more likely to see them, thereby substantially increasing driving safety. This feature is particularly important as, even where the device 10 itself does not obstruct viewing of the truck's existing signal lights, the load carried thereon may do so.

Figure 4:
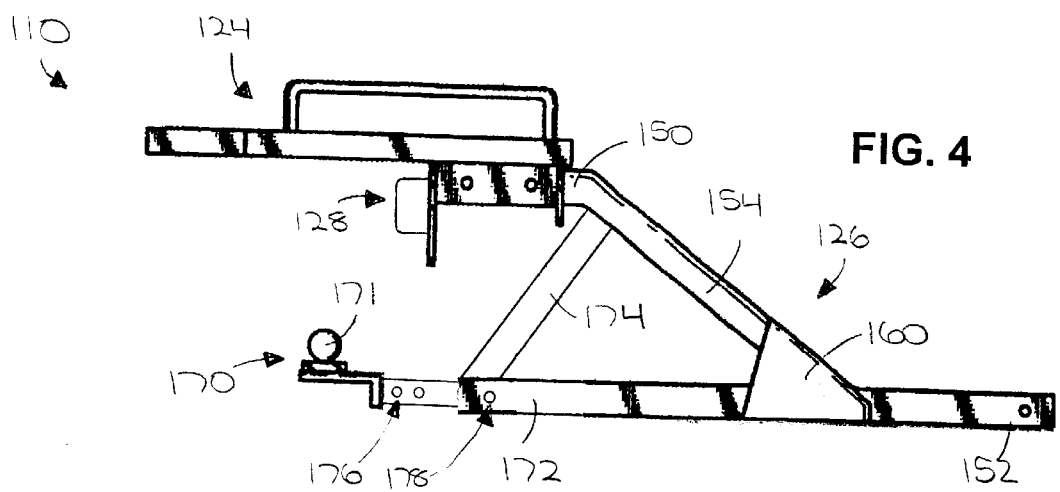
FIG. 4 is an elevational view of a preferred second embodiment of the device of the present invention, wherein the device includes a hitch structure.

Referring also to FIG. 4, a preferred second embodiment of the device 110 of the present invention is shown which is substantially similar to the above-described first embodiment, including the deck 124; the support structure 126; and the signaling system 128. The second embodiment, however, also includes a hitch structure 170, which may include, for example, a conventional ball hitch 171, operable to couple the truck 12 with a trailer or other towed vehicle via the device 110. In a typical prior art truck bed extension device, the device either takes the place or obstructs use of an existing hitch. The hitch structure 170 of the present invention, however, advantageously provides the ability to tow while the device 110 is mounted.

As illustrated, inclusion of the hitch structure 170 is accomplished by adding a third end 172 which projects rearwardly beyond the intersection of the second end 152 and the center section 154. The hitch structure 170 is secured to a rearmost portion of the third end 172 where use of the hitch structure 170 is not substantially inhibited by the presence of the remainder of the device 110. As desired, the third end 172 may take the form of sleeve operable to adjustably receive the hitch structure 170. In this event, one or more holes 176,178 may be provided in both the third end 172 and in the hitch structure 170 received therein, wherein the holes 176,178 are operable to align and to removably receive pins or bolts for securing the hitch structure 170 in a desired position relative to the third end 172, so as to allow the ball hitch 171 to be spaced more or less apart therefrom. As desired, the gusset 160 may be increased in size to include the third end 172, thereby structurally strengthening the intersection of the second end 152, the third end 172, and the center section 154. Furthermore, as desired, the third end 172 and the second end 152 may be opposite ends of a single piece of material.

Additionally, an additional structural member 174 may be included extending between the third end 172 and either the first end 150 or an upper portion of the center section 154, thereby providing additional support for the deck 124 and enhancing the stability of the third end 172. The additional structural member 174 is preferably constructed of commonly available 2 inch or 2.5 inch box tubing, or, alternatively, of a similarly lightweight and strong material.

In exemplary use and operation, the second end 52 of the support structure 26 is placed within the receiver 20 such that the one or more holes 56 in the receiver 20 align with the corresponding holes in the second end 52, whereafter a pin or bolt may be set through the aligned holes, thereby securing the device 10 to the truck 12. The tailgate 16 may then be lowered and the coupling sleeve 36 of the deck 24 placed over the first end 50 of the support structure 26. The deck 24 is then adjusted upon the first end 50 until the platform surface 32 is the preferred distance from the lowered tailgate 16 and one or more of the holes 44 in the coupling sleeve are aligned with corresponding holes in the first end 50, whereafter a pin or bolt may be set through the aligned holes, thereby securing the deck 24 in position. The signaling system 28 is then electrically connected to the existing electrical system of the truck 12 using, for example, a conventional and commonly available towing connector for removably coupling the signaling system of a towing vehicle with that of a towed vehicle. Lastly, the truck's license plate may be bolted to the rear of the device 10 using the license plate attachment mechanism 46.

Where the hitch structure 170 is included and desired to be used, a trailer or other towed vehicle may be coupled therewith following completion of the above procedure. Where the hitch structure 170 is adjustable within the third end 172, the hitch structure 170 may be slidably adjusted to a desired position and then secured prior to coupling the trailer therewith.

From the preceding description, it can be appreciated that the device 10 of the present invention provides substantial advantages over the prior art, including, for example, that the device 10 provides a substantially planar platform surface 32 suitable, for example, for resting and supporting wheels or legs upon. Furthermore, horizontal positioning of the device 10 is advantageously adjustable relative to the existing cargo bed structure so that a desired closeness and clearance can be achieved. Additionally, vertical positioning of the device 10 may be offset from the plane of the lowered tailgate 16 when unloaded so as to be flush therewith when loaded. Additionally, the device 10 provides a signaling system 28, including brake lights 64a,64b and left and right turn signals 66a,66b, which is electrically coupleable with the truck's electrical system so as to make brake and turn signals visible to following drivers, thereby making the device 10 safer and more compliant with the law than prior art truck bed extension devices. Additionally, the device 10 provides a license plate attachment mechanism for securing a license plate in a position where it is properly visible to following drivers. Additionally, in one embodiment, the device 110 advantageously provides a hitch structure 170 for coupling the truck 12 with a trailer or towed vehicle via the device 110.

Although the present invention has been described with reference to the preferred embodiment illustrated in the attached drawings, it is noted that equivalents may be employed and substitutions made herein without departing from the scope of the present invention as recited in the claims. Furthermore, applications are contemplated for the device 10 herein described that require only minor modifications to the device 10 as disclosed. Thus, for example, alternative embodiments are contemplated wherein the device 10 is coupled with a front or side rather than a rear of the truck 12. In this case, all references to a rear of the truck 12 or the device 10 should be interpreted, where appropriate, as "facing away from" the truck 12. Furthermore, though described herein as having certain preferred dimensions and being constructed of various preferred materials, any suitable dimensions and materials may be used without departing from the contemplated scope of the present invention.

Having thus described the preferred embodiment of the invention, what is claimed as new and desired to be protected by Letters Patent includes the following:

1. A device for use with a vehicle having a cargo bed structure, the device comprising:

a deck having a surface, wherein the surface of the deck is between approximately 2 feet and 4 feet long, and between approximately 4 feet and 6 feet wide; and a support structure having a first end and a second end, wherein the first end is adapted to couple with the vehicle and the second end is adapted to couple with the deck such that, when so coupled, the surface of the deck is spaced between approximately 0.25 inch and 1.00 inch horizontally apart from the cargo bed structure and between approximately 0.25 inch and 1.00 inch above the cargo bed structure.

2. A device for use with a vehicle having a cargo bed structure, the device comprising:

a deck having a surface, wherein the surface of the deck is between approximately 2 feet and 4 feet long, and between approximately 4 feet and 6 feet wide;

a support structure having a first end and a second end, wherein the first end is adapted to couple with the vehicle and the second end is adapted to couple with the deck such that, when so coupled, the surface of the deck is spaced between approximately 0.25 inch and 1.00 inch horizontally apart from the cargo bed structure and between approximately 0.25 inch and 1.00 inch above the cargo bed structure; and a signal light system electrically coupleable with an electrical system of the vehicle, wherein the signaling light system includes a brake light and a left turn signal light and a right turn signal light oriented so as to face away from the vehicle.

3. A device for use with a vehicle having a cargo bed structure and a receiver, the device comprising:
- a deck having a surface, wherein the surface is between approximately 2 feet and 4 feet long and is between approximately 4 feet and 6 feet wide;
- a support structure having a first end and a second end, wherein the first end is adapted to removably couple with the receiver of the vehicle and the second end is adapted to couple with the deck such that, when so coupled, the surface of the deck is spaced between approximately 0.25 inch and 1.00 inch horizontally apart from the cargo bed structure and between approximately 0.25 inch and 1.00 inch above the cargo bed structure;
- a signal light system electrically coupleable with an electrical system of the vehicle, wherein the signal light system includes a brake light and a left turn signal light and a right turn signal light oriented so as to face away from the vehicle; and
- a hitch structure coupled with the support structure and operable to facilitate coupling the vehicle with a towed vehicle via the device.

4. The device as set forth in claim 3, further including a license plate attachment mechanism operable to secure a license plate to the device for rearward-facing display.

5. A device for use with a vehicle having a cargo bed structure and a receiver, the cargo bed structure including a lowerable tailgate, the device comprising:
- a deck having a surface, wherein the surface is between approximately 2 feet and 4 feet long and is between approximately 4 feet and 6 feet wide;
- a support structure having a first end and a second end, wherein the first end is adapted to removably couple with the receiver of the vehicle and the second end is adapted to couple with the deck such that, when so coupled, the surface of the deck is spaced between approximately 0.25 inch and 1.00 inch horizontally apart from the lowered tailgate and between approximately 0.25 inch and 1.00 inch above the lowered tailgate when unloaded and substantially flush with the lowered tailgate when loaded;
- a signal light system electrically coupleable with an electrical system of the vehicle, wherein the signal light system includes a brake light and a left turn signal light and a right turn signal light oriented so as to face away from the vehicle; and
- a hitch structure coupled with the support structure and operable to facilitate coupling the vehicle with a towed vehicle via the device.

6. A device for use with a vehicle having a cargo bed structure and a receiver, the device comprising:
- a deck having a platform support structure and a platform surface, wherein the surface is between approximately 2 feet and 4 feet long and is between approximately 4 feet and 6 feet wide, with at least a portion of the platform surface being removable from the platform support structure for repair and replacement;
- a support structure having a first end and a second end, wherein the first end is adapted to couple with the vehicle and the second end is adapted to couple with the platform support structure of the deck such that, when so coupled, the platform surface of the deck is spaced between approximately 0.25 inch and 1.00 inch horizontally apart from the cargo bed structure and between approximately 0.25 inch and 1.00 inch above the cargo bed structure;
- a signal light system electrically coupleable with an electrical system of the vehicle, wherein the signal light system includes a brake light and a left turn signal light and a right turn signal light;
- a license plate attachment mechanism adapted to allow for securing a license plate to the device for rearward-facing display; and
- a hitch structure coupled with the support structure and operable to facilitate coupling the vehicle with a towed vehicle via the device.

* * * * *